United States Patent [19]

Weagant

[11] 3,758,210
[45] Sept. 11, 1973

[54] SUPERVISORY APPARATUS FOR SPECTRAL ANALYSIS

[75] Inventor: Robert A. Weagant, Chelmsford, Mass.

[73] Assignee: Honeywell Inc., Minneapolis, Minn.

[22] Filed: Aug. 6, 1970

[21] Appl. No.: 61,756

[52] U.S. Cl............................. 356/51, 356/79, 356/98
[51] Int. Cl............................. G01j 3/18, G01n 21/34
[58] Field of Search........................ 356/51, 74–101; 350/162 R, 293

[56] References Cited
UNITED STATES PATENTS
2,671,376  3/1954  Merton ..................... 350/162 R X
3,472,594  10/1969 Hughes et al. ............. 350/162 R X

OTHER PUBLICATIONS

Sletten et al., "The Paraboloid Mirror," Applied Optics, Vol. 4, No. 10, October 1965, pages 1240–1244.
Low, "Observing Plans for October's Eclipse –II," Sky and Telescope, Vol. 17, No. 9, July 1958, pages 450–452.

Primary Examiner—Ronald L. Wibert
Assistant Examiner—F. L. Evans
Attorney—Charles J. Ungemach, Ronald T. Reiling and George W. Field

[57] ABSTRACT

An assemblage of diffractors and detector arrays associated with off-axis paraboloidal reflecting means to give a multi-spectral scanner of unprecedentedly wide wavelength range. Light from the source to be scanned is distributed to detection channels in the visible, near infrared, and thermal or far infrared wavelength regions by a novel spatial beam splitter, and common to two of the detector channels is a component which functions as a simple reflector in one channel and a diffracting reflector in the other, thus performing a further beam splitting function on the basis of wavelength rather than spatial position.

10 Claims, 4 Drawing Figures

INVENTOR.
ROBERT A. WEAGANT

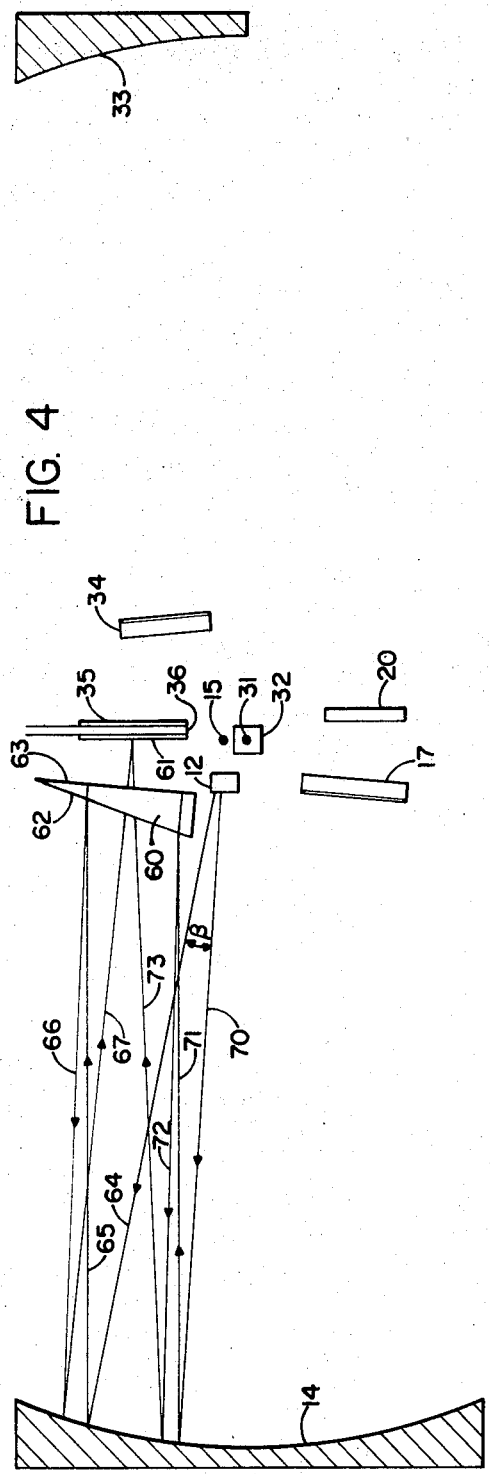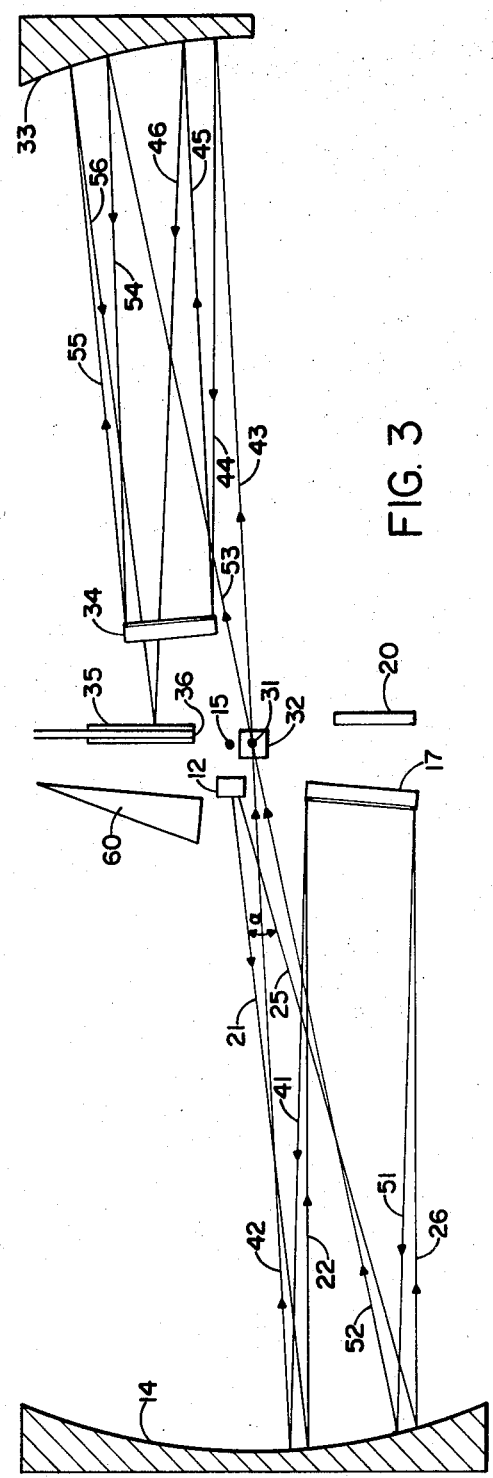

SUPERVISORY APPARATUS FOR SPECTRAL ANALYSIS

BACKGROUND OF THE INVENTION

This invention relates to the field of optical instruments, and more particularly to a spectroradiometer for examining a source of electromagnetic energy to determine what frequencies or wavelengths it contains. Simple spectrometers are well known both with prisms and with gratings as the diffracting members, but such instruments are inherently incapable of response to a wide range of frequencies, and the basic components must be replicated again and again if full coverage from the visible to the far infrared is to be obtained.

SUMMARY OF THE INVENTION

The object of the present invention is to provide an absolute spectroradiometer containing a relatively small number of components and capable of construction within reasonably compact dimensions, which will respond to radiation within the full wavelength range of interest.

Various other objects, advantages, and features of novelty which characterize this invention are pointed out with particularity in the claims annexed thereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWINGS

In the drawing,

FIGS. 3 and 4 are views like FIG. 1, but including ray traces for light in the near infrared and thermal or far infrared frequency bands respectively.

DESCRIPTION OF THE PREFERRED EMBODIMENT

Figure 1:
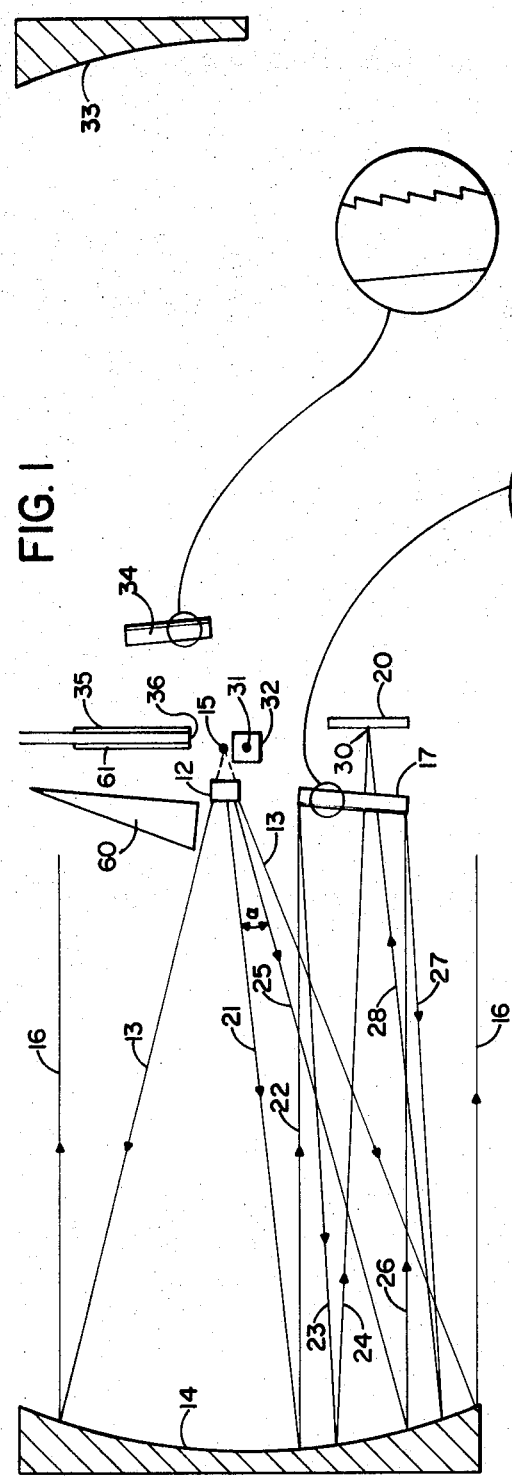
FIG. 1 is a diagrammatic plan are view of an embodiment of my invention, portions of certain reflectors being shown in section, together with a ray trace for light in the visible frequency band.
Figure 2:
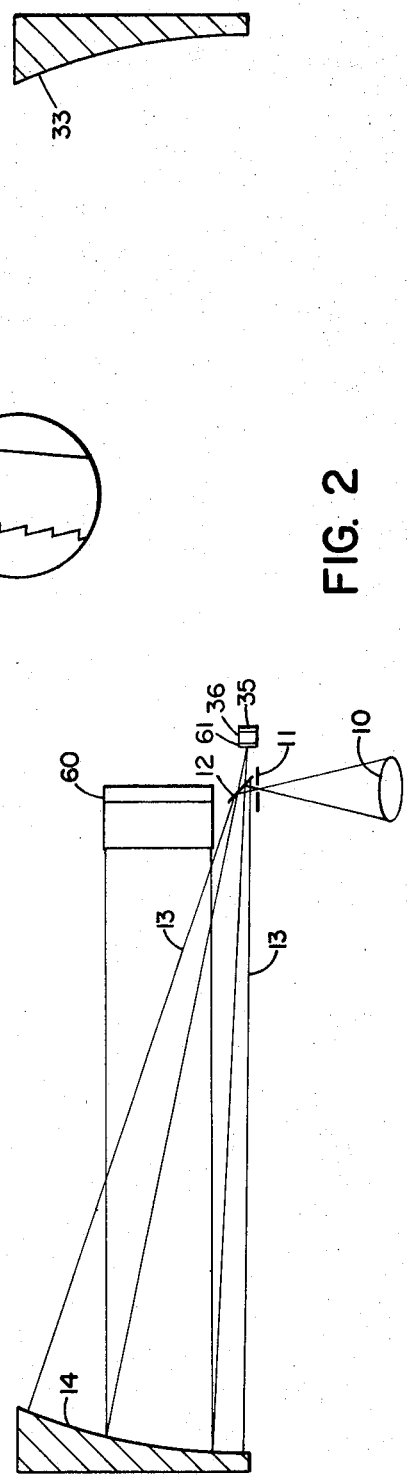
FIG. 2 is a diagrammatic elevational view like FIG. 1, together with a ray trace for light in the far infrared band.

Referring now to FIGS. 1 and 2, light from a source to be examined is shown as a converging beam 10, and may contain wavelengths from the visible into the far infrared or thermal. The beam passes through a slit 11 at its focal point, and is reflected by a mirror 12 in a solid angle bounded by rays 13 toward a first collimating reflector 14 having a reflecting surface configured as a portion of a paraboloid of revolution, the portion effectively lying wholly above the axis of revolution as seen in FIG. 2, and the focus 15 of the paraboloid coinciding with the virtual source of light from reflector 12. Light in the visible and infrared bands is all reflected by members 12 and 14, and emerges from the latter as a collimated bundle of rays bounded by rays 16 and directed parallel to the axis of rotation of the paraboloid.

Of the light striking reflector 14 from reflector 12, that portion encompassed by angle $\alpha$ in FIGS. 1 is used in further components relating to the visible band of frequencies. These components include a diffraction grating 17 and a linear array 20 of photodetectors sensitive in the visible range. For convenience grating 17 may be an echelette, blazed as suggested in the enlarged fragmentary showing. Collimated visible light from reflector 14 falling on grating 17 is reflected therefrom, with diffraction, and the grating is mounted at such an angle with respect to the original axis of collimation that the resulting light, while still collimated, takes different directions for different wavelengths, and upon again striking reflector 14 is returned not to focus 15 but to different points along array 20. For a particular wavelength the bounding rays in this portion of the instrument are traced at 21, 22, 23, 24, and 25, 26, 27, 28. All of these rays come to a focus at point 30 and consequently fall on the individual detector located there. Other wavelengths will follow paths ending at different points along array 20.

The portion of the instrument just described thus gives electrical outputs from detectors in array 20 in accordance with the wavelengths in the visible light band which are present in source 10.

In one embodiment of the invention grating 17 was blazed at 300 lines per inch, and detector array 20 was made up of 18 individual detectors arranged in line and mutually insulated electrically.

Inspection of FIG. 1 shows that the visible light emerging from grating 17 follows impinging on the grating. FIG. 3 shows that light in the thermal range is reflected from grating 17 essentially specularly, at such a different direction that after falling, still collimated, on reflector 14 again it is focused at a point 31 different from focus 15 but still not lying on array 20. A plane reflector 32 folds this beam so that it falls on a second collimating reflector 33, having a paraboloidal configuration with its focus at point 32 and effecitvely lying wholly above the axis of rotation of the paraboloid, as seen both in FIG. 2 and in FIG. 3. The light is collimated by reflector 33 and reflected to a second grating 34, which reflects the far infrared wavelengths with diffraction back to reflector 33: the latter focuses them on one of a plurality of detectors sensitive to light of this wavelength and arranged in a second array 35. In the embodiment of the invention referred to above, grating 34 was also an echelette, and was blazed, as is suggested in the second enlarged showing of FIG. 1, at seven lines per inch, and array 35 consisted of five detectors. This array is shown as mounted on a refrigerated base or "cold finger" 36, since these detectors must be cooled for efficient operation. For a particular wavelength the boundary rays in this portion of the instrument are traced at 21, 22, 41, 42, 43, 44, 45, 46, and 25, 26, 51, 52, ,53, ,54, ,55, ,56.

From the foregoing it will be clear that grating 17 acts as a beam splitter based on wavelength, reflecting light in a particular region with diffraction and light in another region specularly in a different direction.

The apparatus shown thus far is adequate for light in the visible and far infrared regions. For light in the near infrared region the apparatus includes further components shown in FIG. 4 to incude a prism 60 transparent to near infrared light and a further array 61 of detectors sensitive to light in the near infrared region, mounted on refrigerated base 36. A different portion $\beta$ of the light from reflector 12 is used for this purpose, and is collimated initially parallel to portion 22, 26 of the light in FIGS. 1 and 3 to fall on one face 62 of prism 60, where it is refracted into the prism and strikes the opposite face 63 internally. Face 63 is silvered or otherwise made reflecting, and therefore the light retraces a path to surface 62. Here it is again refracted to follow a new path, still collimated, in a somewhat different direction from that at which it approached the prism, to be again reflected at 14 and focused on a point along array 61 determined by the wavelength of the light. The bounding rays for this portion of the apparatus may be traced at 64, 65, 66, 67, and 70, 71, 72, 73. In the embodiment of the invention previously referred to array 61 was made up of six detectors, and prism 60 was composed of barium fluoride.

It is to be appreciated that if light of several wavelengths in any region is present in the source, several detectors in the associated array will be energized. The instrument can thus respond to the presence of different wavelengths in the near infrared region, far infrared region, and visible range.

It will be noted that reflector 14 acts as a beam splitter on a spatial basis, whereas grating splitter acts as a beam splitter on a wavelength basis.

The prism, reflectors, gratings, and detectors making up the apparatus are mounted in a suitable housing by conventional means, not shown to avoid unnecessarily complicating the drawing.

The foregoing description and the drawing are illustrative of my invention, which I now claim as follows.

I claim:

1. Optical apparatus for use with radiation which may contain wavelengths in the thermal, near infrared, and visible bands comprising, in combination:

means supplying said radiation is a collimated beam;
   means including a first dispersive member mounted to intercept a first portion of said beam for dividing said first portion into a first collimated subportion containing energy of wavelengths in the thermal band and a plurality of independently collimated subportions containing respectively energy of different wavelengths in the visible band;
   means mounted to receive said plurality of subportions for focusing the energy thereof at distinct locations determined by the respective wavelengths;
   means including a second dispersive member mounted to receive said first subportion for dividing it into a plurality of further independently collimated subportions containing severally energy of different wavelengths in the thermal band;
   and means mounted to receive the last named subportions for focusing the energy thereof at distinct locations determined by the respective wavelengths.

2. Apparatus according to claim 1 together with detecting means mounted at said distinct locations for giving distinct electrical outputs in response to the energy focused there.

3. Apparatus according to claim 1 in which the first dispersive member comprises an echelette.

4. Apparatus according to claim 1 in which the second dispersive member comprises an echelette.

5. Apparatus according to claim 1 in which the first and second dispersive members comprises echelettes having fine and coarse blazings respectively.

6. Apparatus according to claim 1 wherein the collimating means and the focusing means comprises confocal paraboloidal reflectors.

7. Apparatus according to claim 2 wherein the collimating means comprises an off-axis paraboloid of revolution, together with means for supplying radiation as a beam diverging from the virtual focus of said paraboloid.

8. Apparatus according to claim 1 together with means including a further dispersive member mounted to intercept a second portion of said beam for dividing it into a plurality of independently collimated subportions containing severally energy of different wavelengths in the near infrared band;
   and a means mounted to receive the last named subportions for focusing the energy thereof at distinct locations determined by the respective wavelengths, and giving distinct electrical outputs in response thereto.

9. Apparatus according to claim 2 in which the first named means comprises first paraboloid reflector and the last named means comprises a second paraboloid reflector confocal with the first reflector.

10. Means for dividing a beam of polychromatic electromagnetic energy to the portions having identical wavelength distributions comprising, in combination:
    catoptric means converting said beam to a collimated beam of significant cross sectional area;
    and a plurality of utilization assemblies mounted to intercept separate portions of said beam.

* * * * *